United States Patent
Lee et al.

(10) Patent No.: US 6,636,527 B1
(45) Date of Patent: Oct. 21, 2003

(54) OPTICAL LINE TERMINATION IN ATM-BASED PON

(75) Inventors: Seog-Hoon Lee, Taejon (KR); Hong-Ju Kim, Taejon (KR); Jae-Geun Kim, Taejon (KR)

(73) Assignee: Electronics and Telecommunications Research Institute, Taejon (KR)

(*) Notice: Subject to any disclaimer, the term of this patent is extended or adjusted under 35 U.S.C. 154(b) by 0 days.

(21) Appl. No.: 09/497,133

(22) Filed: Feb. 3, 2000

(30) Foreign Application Priority Data

Dec. 24, 1999 (KR) .......................................... 99-61931

(51) Int. Cl.[7] .............................................. H04J 14/02
(52) U.S. Cl. ...................................................... 370/465
(58) Field of Search ................................ 370/443, 437, 370/439, 449, 465; 713/200, 201, 202; 398/79, 89, 98, 139

(56) References Cited

U.S. PATENT DOCUMENTS

| | | | | |
|---|---|---|---|---|
| 5,018,130 A | * | 5/1991 | Suzuki et al. ................. 398/51 |
| 5,208,691 A | * | 5/1993 | Nishio ......................... 398/46 |
| 5,398,129 A | * | 3/1995 | Reimann ..................... 398/100 |
| 5,483,370 A | * | 1/1996 | Takahashi .................... 398/50 |
| 5,506,712 A | * | 4/1996 | Sasayama et al. ............ 398/47 |
| 5,523,870 A | * | 6/1996 | Suzuki et al. ................ 398/100 |
| 5,541,924 A | * | 7/1996 | Tran et al. ................... 370/347 |
| 5,543,951 A | * | 8/1996 | Moehrmann ................. 398/154 |
| 5,606,555 A | * | 2/1997 | Singer ......................... 370/465 |
| 5,739,934 A | * | 4/1998 | Nomura et al. ............... 398/79 |
| 5,761,197 A | * | 6/1998 | Takefman .................... 370/337 |
| 5,815,295 A | * | 9/1998 | Darcie et al. ................. 398/72 |
| 5,841,556 A | * | 11/1998 | Hong et al. ................... 398/46 |
| 5,854,701 A | * | 12/1998 | Clarke et al. ................ 398/100 |
| 5,926,478 A | | 7/1999 | Ghaibeh et al. ............. 370/395 |
| 5,930,018 A | | 7/1999 | Effenberger ................. 359/158 |
| 6,023,467 A | * | 2/2000 | Abdelhamid et al. ..... 370/236.2 |
| 6,317,234 B1 | * | 11/2001 | Quayle ......................... 398/9 |
| 6,411,410 B1 | * | 6/2002 | Wright et al. ................. 398/79 |

* cited by examiner

Primary Examiner—Wellington Chin
Assistant Examiner—William Schultz
(74) Attorney, Agent, or Firm—Jacobson Holman PLLC

(57) ABSTRACT

An optical line termination in an asynchronous transmission mode includes a downstream frame processing unit for receiving and churning an asynchronous mode cell to generate a downstream frame, and converting a parallel data of the downstream frame into a serial data thereof, a wavelength division multiplexing unit for performing an electro/optical conversion of the serial data of the downstream frame and performing a wavelength division multiplexing thereof, an upstream frame processing unit for extracting data from the wavelength division multiplexing unit, searching an overhead field, delineating a slot boundary, and processing a PLOAM cell and a divided slot separately, a control signal generation unit for performing a MAC protocol and generating variables and timing signals used for the downstream frame processing unit and the upstream frame processing unit, and a control unit for controlling the downstream frame processing unit and the upstream frame processing unit by using the variables and the timing signals from the control signal generation unit.

9 Claims, 10 Drawing Sheets

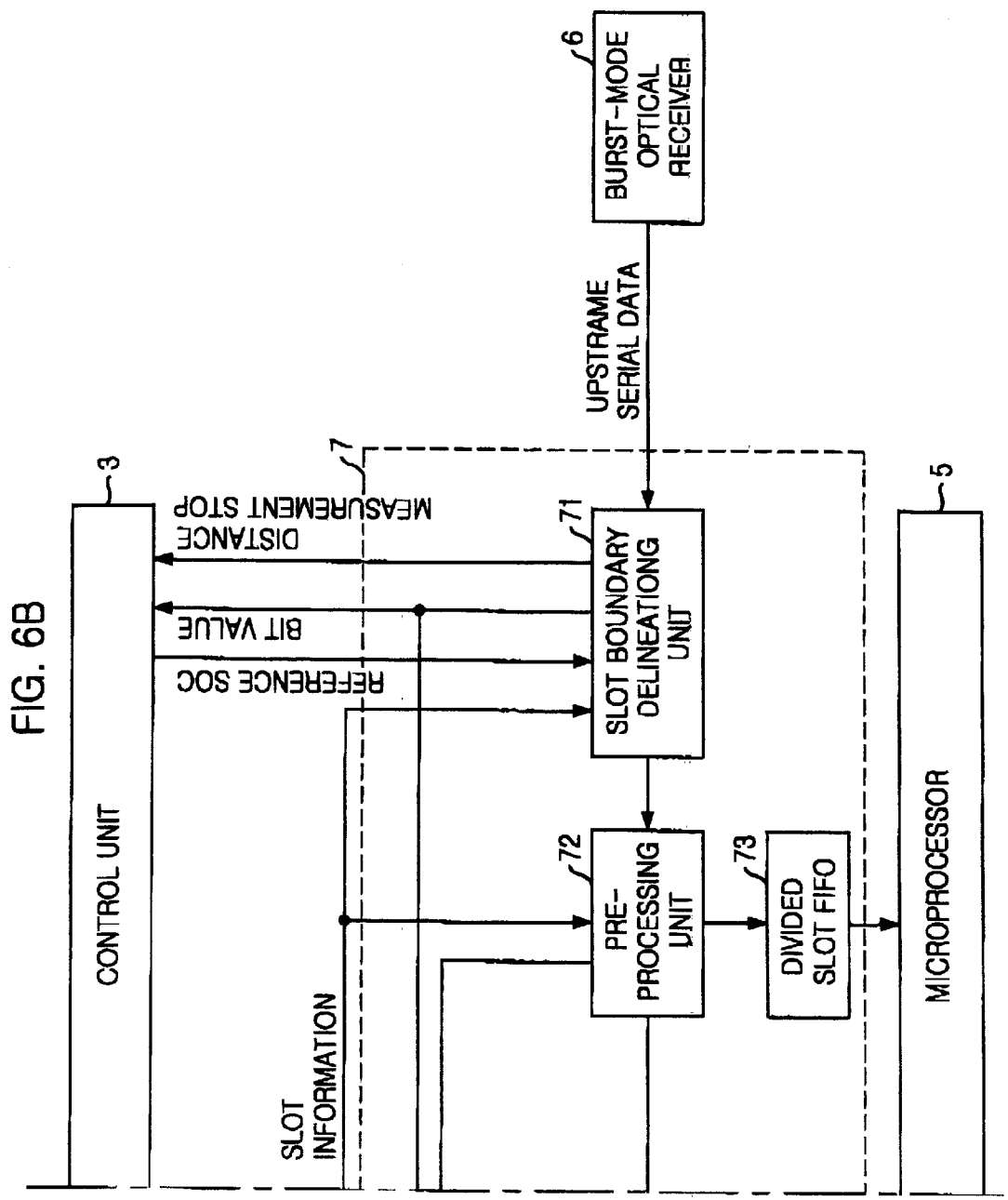

OPTICAL LINE TERMINATION IN ATM-BASED PON

FIELD OF THE INVENTION

The present invention relates to an optical access network in an optical communication system; and more particular, to an optical line termination (OLT) in an asynchronous transfer mode—passive optical network (ATM—PON).

DESCRIPTION OF THE PRIOR ART

A conventional optical access network uses a pair of optical cables per subscriber. One of the pair of optical cables is used for time division multiplexing (hereinafter, referred to as TDM) in a downstream direction, and the other of the pair of optical cables is used for time division multiple access (hereinafter, referred to as TDMA) in an upstream direction, thereby transmitting a voice, integrated services digital network (ISDN) and digital television signals. Therefore, an initial installation cost of the optical cable is very high and it is difficult to provide various and flexible services.

SUMMARY OF THE INVENTION

It is, therefore, an object of the present invention to provide an optical line termination (OLT) in an asynchronous transfer mode—passive optical network (ATM—PON), capable of providing a maximum ATM servicing capacity and reducing a manufacturing cost.

In accordance with an aspect of the present invention, there is provided an optical line termination in an asynchronous transmission mode, comprising: a downstream frame processing means for receiving and churning an asynchronous transfer mode cell to generate a downstream frame, and converting a parallel data of the downstream frame into a serial data thereof; a wavelength division multiplexing means for performing an electro/optical conversion of the serial data of the downstream frame and performing a wavelength division multiplexing thereof; an upstream frame processing means for extracting data from the wavelength division multiplexing means, searching an overhead field, delineating a slot boundary, and processing a PLOAM cell and a divided slot separately; a control signal generation means for performing a MAC protocol and generating variables and timing signals used for the downstream frame processing means and the upstream frame processing means; and a control means for controlling the downstream frame processing means and the upstream frame processing means by using the variables and the timing signals from the control signal generation means.

In accordance with another aspect of the present invention, there is provided a churning method in an asynchronous transfer mode, comprising the steps of: a) requesting a new churning key through a new key request message to an ONU, wherein the ONU completes a distance measurement; b) transmitting the new churning key to the OLT through the new key request message; c) in case where the OLT receives the new churning key predetermined times, transmitting a churning key update message to the ONU predetermined times at a predetermined interval together with a transmission numbers; and d) after receiving a first correct churning key update message, transmitting an acknowledge signal representing a message reception to the OLT.

In accordance with further another aspect of the present invention, there is provided a method for allocating a down message in an optical line termination, comprising the steps: a) in case where a current state is not an express message slot and a message memory is empty, transmitting a serial number mask message and a request password message one time; b) transmitting the other message three times, thereby determining the transmission numbers according to a message identification read out from a memory; and c) in case where the message memory is empty and is not the express message slot, transmitting a NO message.

BRIEF DESCRIPTION OF THE DRAWINGS

Other objects and aspects of the invention will become apparent from the following description of the embodiments with reference to the accompanying drawings, in which:

FIGS. 6A and 6B are block diagrams illustrating an upstream frame processing unit in an OLT according the present invention;

DETAILED DESCRIPTION OF THE PREFERRED EMBODIMENTS

Figure 1:
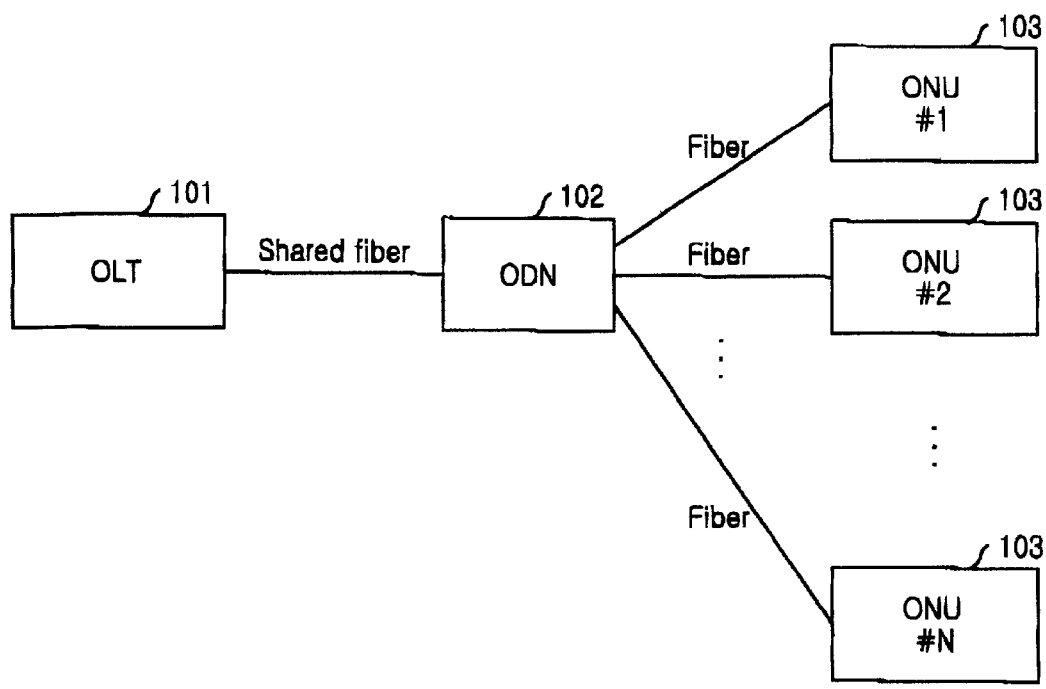
FIG. 1 is a block diagram illustrating an optical communication system according to the present invention.

FIG. 1 is a block diagram illustrating a passive optical network in an optical communication system applicable to the present invention.

Referring to FIG. 1, the passive optical network (hereinafter, referred to as PON) includes an optical line termination (hereinafter, referred to as OLT) 101, an optical distribution network (hereinafter, referred to as ODN) 102 and an optical network unit (hereinafter, referred to as ONU) 103.

The OLT 101 communicates with N numbers of the ONUs through two-way optical fiber transmission paths, wherein N is a positive integer and its maximum value is thirty two. The OLT 101 transmits an information to the ODN 102 over a shared fiber and the ODN 102 transmits the information to N numbers of the ONUs 103 over N numbers of optical fiber links in a broadcasting form.

Based on the recommendation G.983.1 of international telecommunication union telecommunication standardization sector (hereinafter, referred to as ITU—T), each ONU 103 transmits an information to the OLT 101 in an upstream direction by using TDMA.

Figure 2A:
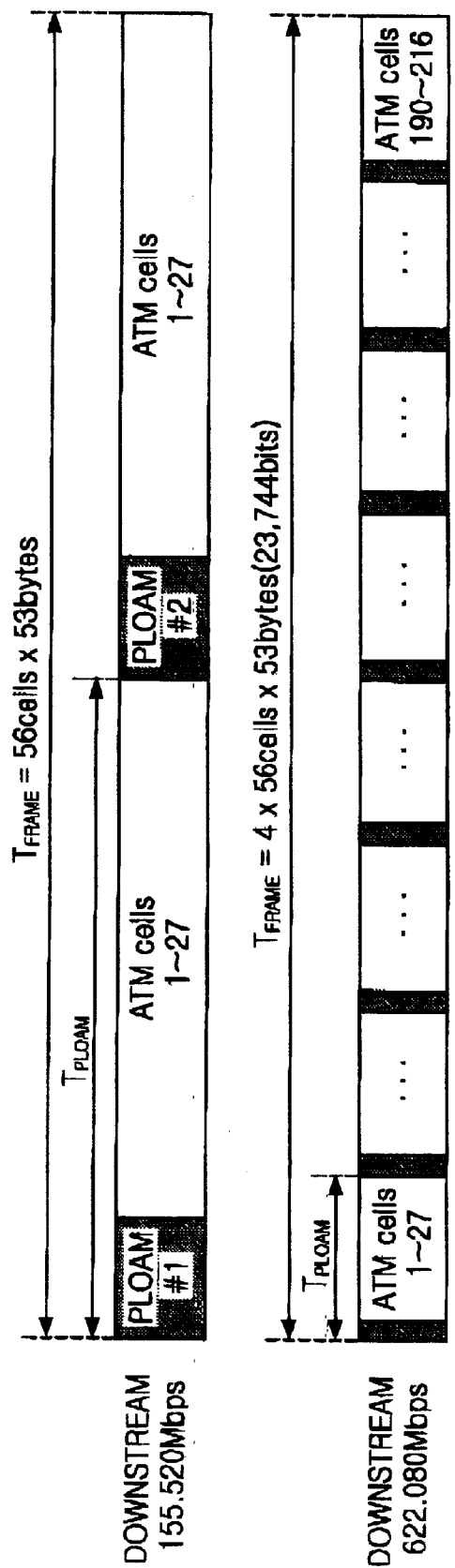
FIGS. 2A and 2B are diagrams showing a structure of a downstream frame and an upstream frame in accordance with an embodiment of the present invention, respectively.
Figure 2B:
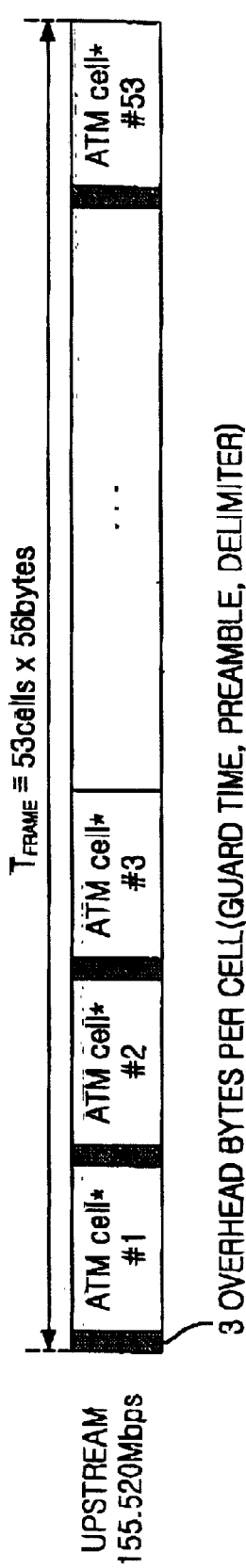

FIGS. 2A and 2B are diagrams of a structure of a downstream frame and an upstream frame in the PON in accordance with an embodiment of the present invention, respectively.

As shown in FIG. 2A, the downstream interface structure for both 155.52 Mbps and 622.08 Mbps includes a continuous stream of time slots, each time slot containing 53 octets of an ATM cell or a physical layer operations administration and maintenance (hereinafter, referred to as PLOAM) cells.

In case of the downstream bit rate of 155.520 Mbps, since the PLOAM cells are inserted every twenty eight time slots, the structure of the downstream frame includes two PLOAM cell slots and fifty four ATM cell slots, thereby forming fifty six time slots totally.

In case of the downstream bit rate of 622.08 Mbps, the structure of the downstream frame includes eight PLOAM cell slots and two hundred sixteen ATM cell slots, thereby forming two hundred twenty four time slots totally.

As shown in FIG. 2B, the structure of the upstream frame includes fifty three time slots, wherein each of the time slots is composed of fifty six bytes. Additionally, under the control of the OLT, one of the PLOAM cell, the ATM cell and a divided slot is respectively allocated to each time slot. Each time slot includes three overhead bytes per cell, wherein the overhead bytes contains three fields of guard time, preamble and delimiter.

The PLOAM cells are used to convey the Physical layer operations administration and maintenance (OAM) information. In addition, they carry the grants used by the ONUs for the upstream access. All OAM related alarms or threshold-crossing alerts triggered by events are transported via message in the PLOAM cells. Also, all ranging and churning related messages are mapped in the message field of the PLOAM cell.

Figure 3:
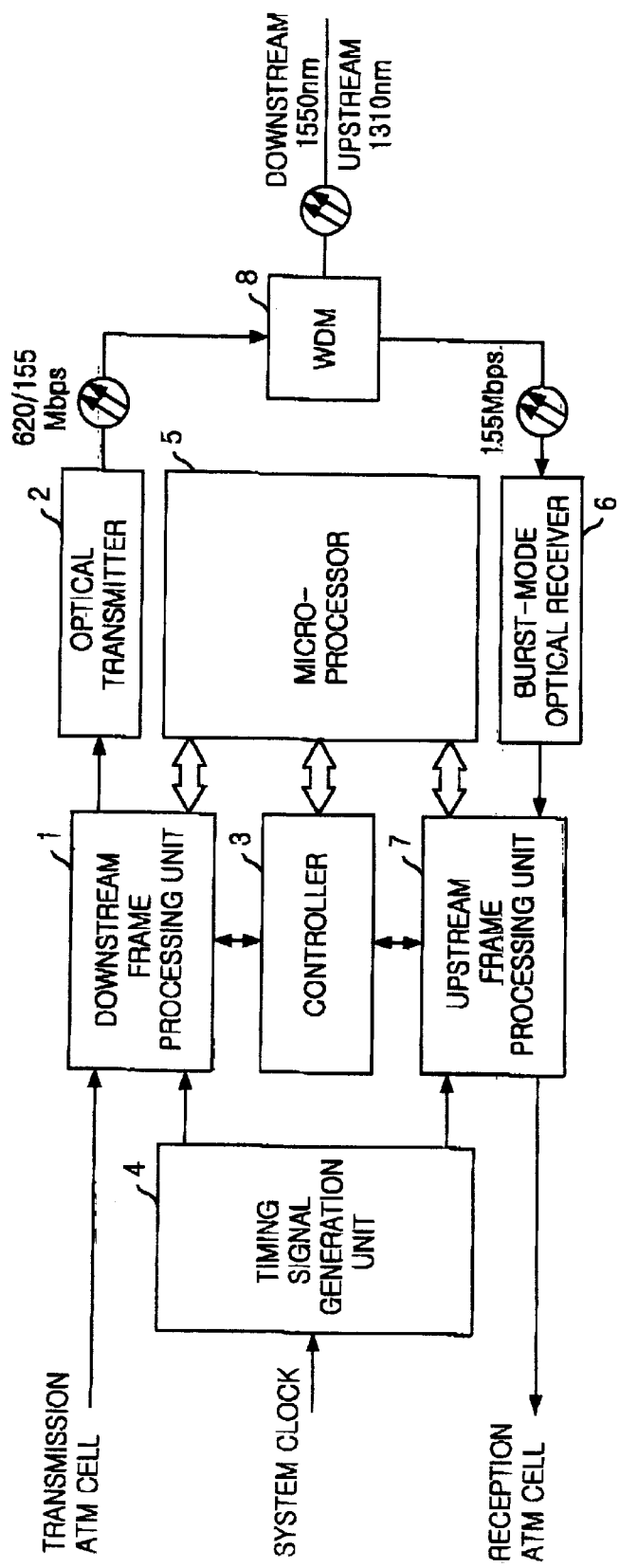
FIG. 3 is a block diagram illustrating an OLT according to the present invention.

FIG. 3 is a block diagram illustrating an OLT according to the present invention.

Referring to FIG. 3, the OLT 101 includes a downstream frame processing unit 1, an optical transmitter 2, a control unit 3, a timing signal generation unit 4, a microprocessor 5, a burst-mode optical receiver 6, an upstream frame processing unit 7, and a wavelength division multiplexer (hereinafter, referred to as WDM) 8.

The downstream frame processing unit 1 receives and churns ATM cells from an external ATM layer processing unit on the basis of byte and word through ATM forum specification, i.e., universal test & operations physical interface for ATM (hereinafter, referred to as UTOPIA). Then, the ATM cells are inserted into the downstream frame shown in FIG. 2A. Additionally, the downstream frame processing unit 1 has a function of calculating and inserting bit inter-leaved parity-8 (hereinafter, referred to as BIP-8) with respect to the downstream frame data, a function of calculating and inserting a header error control (hereinafter, referred to as HEC), and a function of converting byte parallel frame data into serial frame data at a bit rate of 155.520 Mbps or 622.620 Mbps.

The optical transmitter 2 performs an electro/optical conversion of the serial frame data to output an optical signal of 155.520 Mbps or 622.620 Mbps.

The control unit 3 provides control signals for the downstream frame processing unit 1 and the upstream frame processing unit 7.

The timing signal generation unit 4 receives a system clock to provide timing signals which are required for each block.

The microprocessor 5 carries out a media access control (hereinafter, referred to as MAC) protocol to allocate the upstream bandwidth on the PON among the ONUs in a fair, some portion of ranging function, and downstream message generating and upstream message analyzing function. Additionally, the microprocessor 5 carries out a function of aggregating various alarm signals and informing operation system of them and a function of providing variables required for the control of each block.

The burst-mode optical receiver 6 carries out an electro/optical conversion of an upstream optical signal of 155 Mbps and extracts clock, thereby restoring the received data.

Receiving the data of 155.520 Mbps extracted from the burst-mode optical receiver 6, the upstream frame processing unit 7 searches an overhead field, delineates a slot boundary, and generates an information of phase difference between a reference slot signals and the slot boundary. Furthermore, the upstream frame processing unit 7 receives a slot aligned data to perform a scrambling, performs the HEC of the ATM cell to correct a single bit error, and performs a BIP-8 calculation, stores the divided slot data in a request access unit (hereinafter, referred to as RAU) FIFO and outputs the cell having a normal length to the upstream frame processing unit 7. After dividing the received normal cells into a user cell, an IDLE cell and a PLOAM cell, the IDLE cell is discarded, the user cell is transmitted to the receiving UTOPIA matching unit, and the PLOAM cell is transmitted to the OAM processing unit. After extracting the message information from the PLOAM cell, the upstream frame processing unit 7 stores a message information to be processed by software into the message FIFO and the other message information is transmitted to a performance information processing unit, and analyzes the message information and an external signal to detect an OAM related information and generate an alert signal indicating a predetermined threshold excess.

The WDM 8 receives and multiplexes the downstream optical signals of 1550 nm in wavelength from the optical transmitter 2 and the upstream optical signal of 1310 nm in wavelength from the ODN 102. Then, the optical signals of 1550 nm and 1310 nm are transmitted to the ODN 102 and the burst-mode optical receiver 6, respectively.

Figure 4:
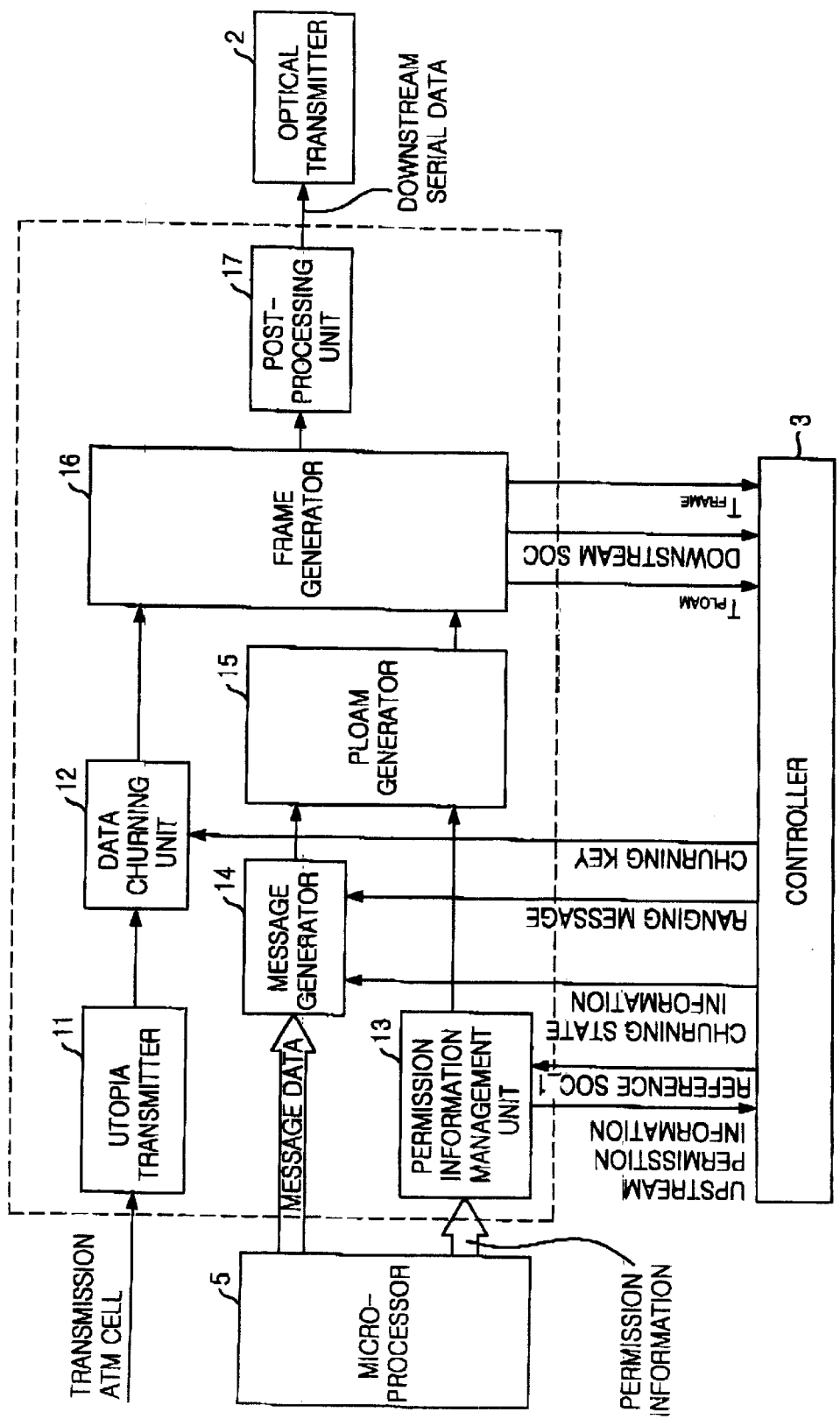
FIG. 4 is a block diagram illustrating a downstream frame processing unit in an OLT according to the present invention.

FIG. 4 is a block diagram illustrating a downstream frame processing unit in the OLT according to the present invention.

Referring to FIG. 4, the downstream frame processing unit 1 includes a UTOPIA transmitter 11, a data churning unit 12, a permission information management unit 13, a message generator 14, a PLOAM generator 15, a frame generator 16, and a post-processing unit 17.

The UTOPIA transmitter 11 receives ATM cells transferred from the external ATM layer and carries out a UTOPIA interface function to match a cell rate of an upper ATM layer with that of ATM—PON physical layer.

The data churning unit 12 churns 8-bit parallel ATM cell data, which are read out at an ATM—PON physical layer rate of 78 Mbps or 19 Mbps, by using 3-byte churning key received from each ONU.

After storing a permission information in a memory device, wherein the permission information is generated based on an ONU buffer state information for a dynamic and fair bandwidth allocation of the upstream band by the microprocessor 5, the permission information management unit 13 maps it into the PLOAM cell of the downstream frame according to a downstream timing signal. Additionally, the permission information management unit 13 output the permission information, which is read out from the memory device according to a reference SOC_1 signal by the control unit 3, as the upstream permission information signal, wherein SOC denotes a start of cell.

The message generator 14 receives a message data from the microprocessor 5 and a churning state information and a ranging message from the control unit 3, determines the contents of the downstream message according to the ONU state and a processing priority, and then outputs it to the PLOAM generator 15.

The PLOAM generator 15 receives the message from the message generator 14 and the permission information from the permission information management unit 13 and makes a complete PLOAM cell, then outputting it to the frame generator 16.

The frame generator 16 receives the downstream ATM cell from the data churning unit 12 and the PLOAM cell from the PLOAM generator 15 and generates the downstream frame shown in FIG. 2A to the post-processing unit 17. Additionally, the frame generator 16 generates timing signals $T_{PLOAM}$, $T_{FRAME}$ and downstream SOC (start of cell), which are required to perform the control unit's function.

The post-processing unit 17 receives the downstream frame data, calculates BIP-8 with respect to the data which are within the period of $T_{PLOAM}$ shown in FIG. 2. The result is inserted into a position of the BIP-8 byte of the PLOAM cell. Then, a scrambling defined as ITU-T I.432 is performed and the HEC is calculated and inserted with respect to each cell within frames, the 8-bit parallel frame data is converted into a serial frame data of 155.520 Mbps or 622.08 Mbps to output it to the optical transmitter 2.

Figure 5:
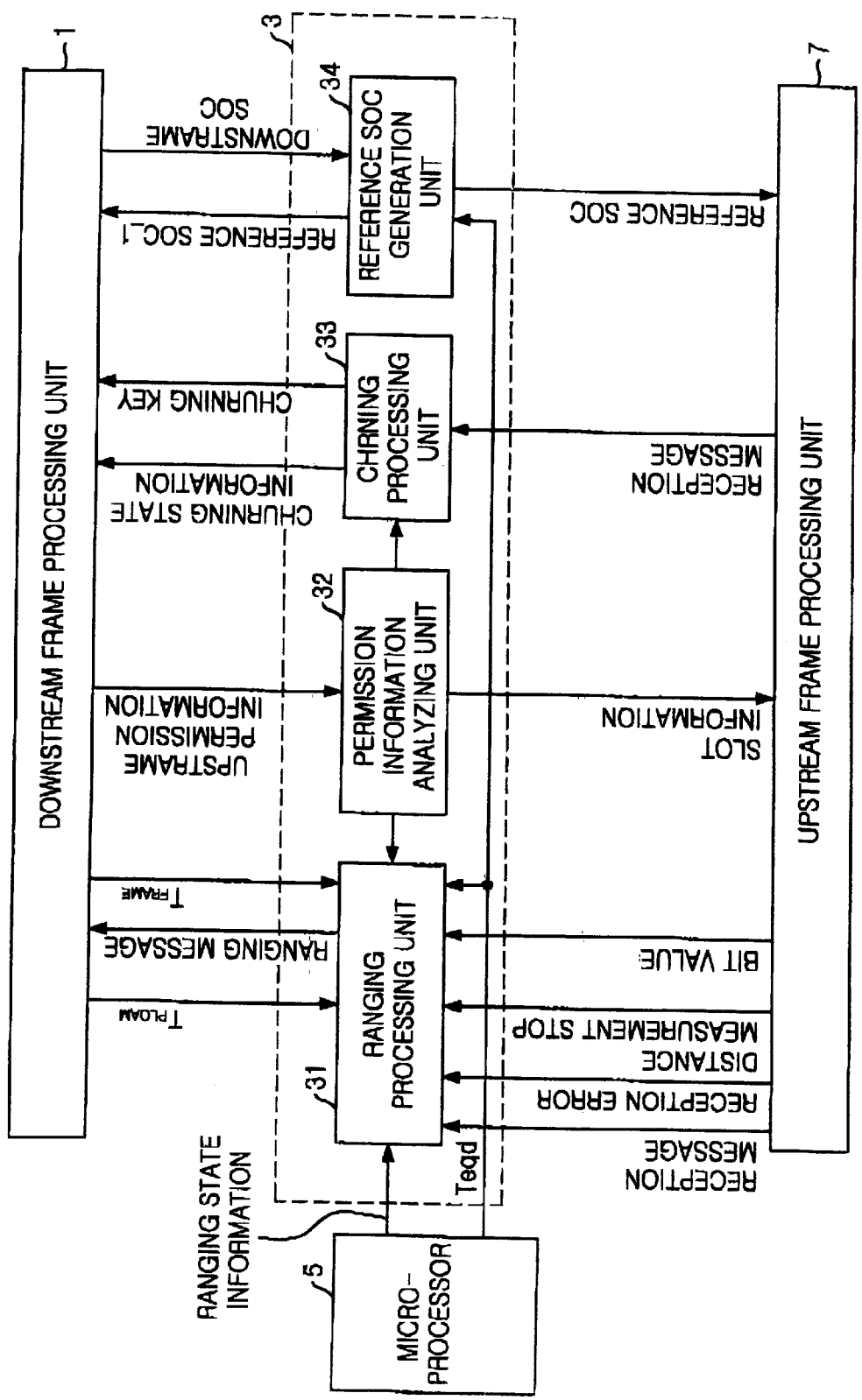
FIG. 5 is a block diagram illustrating a controller in an OLT according to the present invention.

FIG. 5 is a block diagram illustrating a control unit in the OLT according to the present invention.

Referring to FIG. 5, the control unit 3 includes a ranging processing unit 31, a permission information analyzing unit 32, a churning processing unit 33, and a reference SOC (start of cell) generator 34.

The ranging processing unit 31 receives the timing signal $T_{PLOAM}$ and $T_{FRAME}$, a ranging status information signal and a total turn-around delay time $T_{eqd}$, a reception error from the upstream frame processing unit 7, a distance measurement stop, a bit value signal, a slot information signal from the permission information analyzing unit 32, and performs a distance measurement function to each ONU, connected to the PON. Then, the ranging processing unit 31 calculates cell transmission rate of each ONU and its result is transmitted to the downstream frame processing unit 1 over the ranging message signal in order to make all the ONUs to be positioned at a virtually same distance, i.e., $T_{eqd}$.

The permission information analyzing unit 32 analyzes the upstream permission information from the downstream frame processing unit 1 to determine as to whose ONU and whose cell a current received slot is, and to output a result to the upstream frame processing unit 7 and the ranging processing unit 31.

The churning processing unit 33 receives a reception message signal from the upstream frame processing unit 7 and a slot information from the permission information analyzing unit 32 and extracts churning keys contained in the reception message signal according to respective ONUs, then transmitting it to the downstream frame processing unit 1.

The reference SOC generator 34 receives the downstream SOC signal from the downstream frame processing unit 1 to generate a reference SOC signal delayed as much as $T_{eqd}$ to the upstream frame processing unit 7. Additionally, the reference SOC generator 34 generates a reference SOC_1 signal more preceding by one slot than the reference SOC signal to the downstream frame processing unit 1.

Figure 6A:
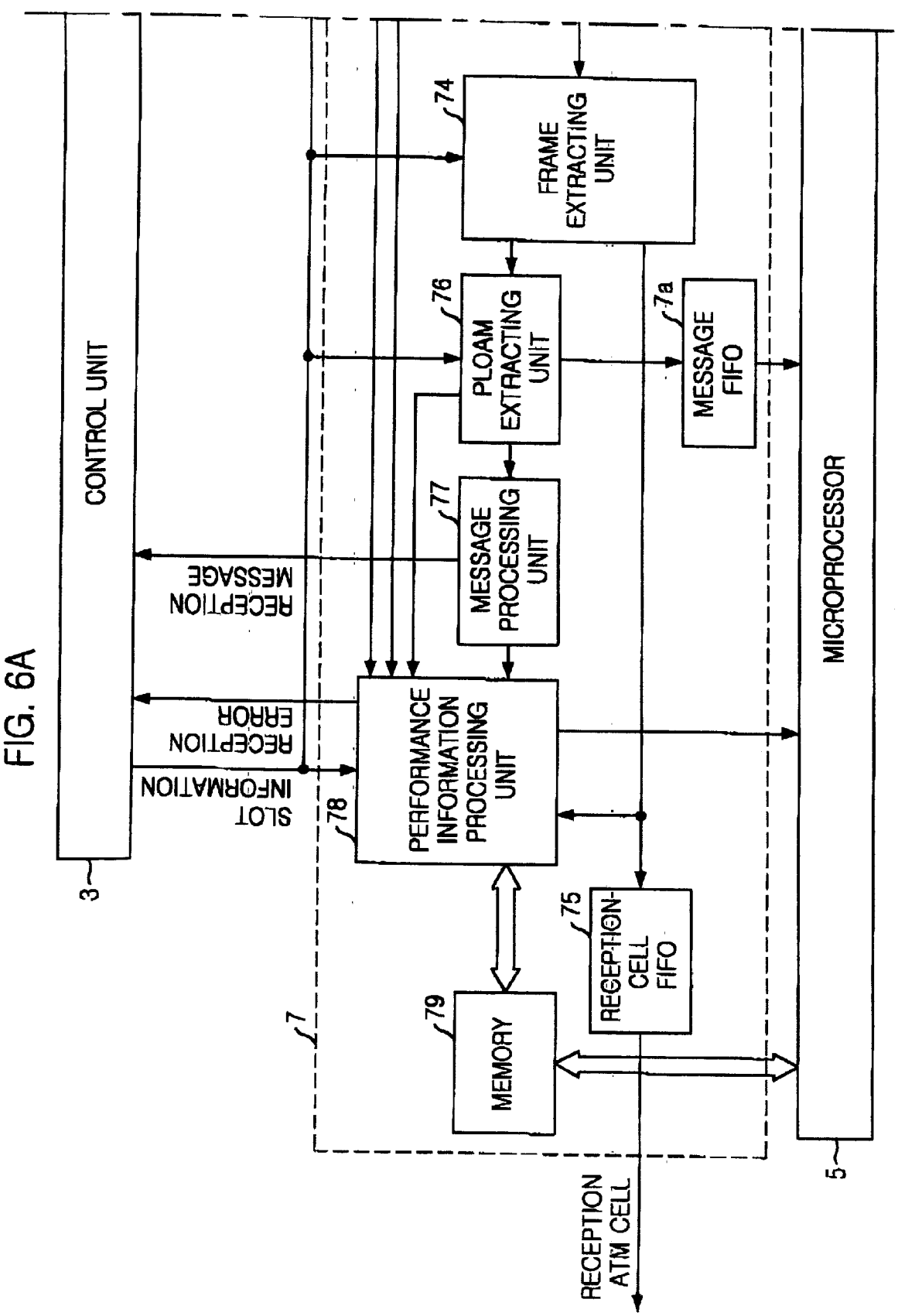

FIGS. 6A and 6B are block diagrams illustrating an upstream frame processing unit 7 in the OLT according to the present invention.

Referring to FIGS. 6A and 6B, the upstream frame processing unit 7 includes a slot boundary delineating unit 71, a pre-processing unit 72, a divided slot FIFO (First In First Out) 73, a frame extractor 74, a UTOPIA receiver 75, a PLOAM extractor 76, a message processing unit 77, a performance information processing unit 78, and a memory device 79.

The slot boundary delineating unit 71 receives the upstream serial data of 155.520 Mbps and the slot information and the reference SOC from the control unit 3 and delineates a boundary of the upstream slot to transmit the delineated cell to the pre-processing unit 72. Additionally, the delineated slot boundary is compared with the reference signal and the difference value therebetween, i.e., the bit value signal, is outputted to the control unit 3 and the performance information processing unit 78, and transmits the distance measurement stop signal to the control unit 3 at the time when the slot boundary is delineated.

The pre-processing unit 72 descrambles the scrambled data from the each ONU. At this time, in case where the divided slot cell has a queue information of each ONU, the pre-processing unit 72 outputs it to the divided slot FIFO 73 and the head error check is carried out to the other cells to correct the single bit error and then, the cell data is transmitted to the frame extractor 74 and the results of the error check as well as BIP-8 calculation are transmitted to the performance information processing unit 78.

The divided slot FIFO 73 transmits the divided slot data stored therein to the microprocessor 5.

The frame extractor 74 classifies the upstream cell, discarding an IDLE cell, outputting a user cell to the UTOPIA receiver 75 and the performance information processing unit 78 and transmitting a PLOAM cell to the PLOAM extractor 76.

The UTOPIA receiver 75 carries out a UTOPIA interface function, wherein the UTOPIA interface is an ATM forum specification. The UTOPIA receiver 75 stores the user cell outputted from the frame extractor 74 in the FIFO and then outputs it under the control of the ATM layer.

The PLOAM extractor 76 receives the slot information signal from the control unit 3 and the PLOAM cell from the frame extractor 74 to check as to whether the ONU number and the message number are equal to each other or not. The checked result is transmitted to the performance information processing unit 78, then checking as to what kind the message is. The message to be processed by hardware is transmitted to the message processing unit 77 and the message to be processed by software is transmitted to the message FIFO 7A.

The message processing unit 77 receives the message data from the PLOAM extractor 76 and a message related to the churning and ranging are again transmitted to the control unit 3, and the contents of the performance information message is extracted to be transmitted to the performance information processing unit 78.

The performance information processing unit 78 receives the bit value signal from the slot boundary delineating unit 71, a result of the head error check from the pre-processing unit 72, an ONU number and comparison result signal of the message number from the PLOAM extractor 76, a user cell data from the frame extractor 74, and a message contents of the message processing unit 77. Next, the performance information processing unit 78 processes performance primitive data for each ONU stored in the memory device 79, to thereby generate respective alarm signals including a predefined threshold-crossing alerts to the microprocessor 5 and to transmit the processing result every slot to the memory device 79.

The memory device 79 provides the performance analysis result to the performance information processing unit 78 and the microprocessor 5, and stores the processed result of the performance information processing unit 78 based on the slot unit.

The message FIFO 7a stores the message transmitted from the PLOAM extractor 76 and then transmits it to the microprocessor 5.

Since the PON structurally transmits the downstream information in the broadcasting form, the churning for the privacy and security is required.

Figure 7:
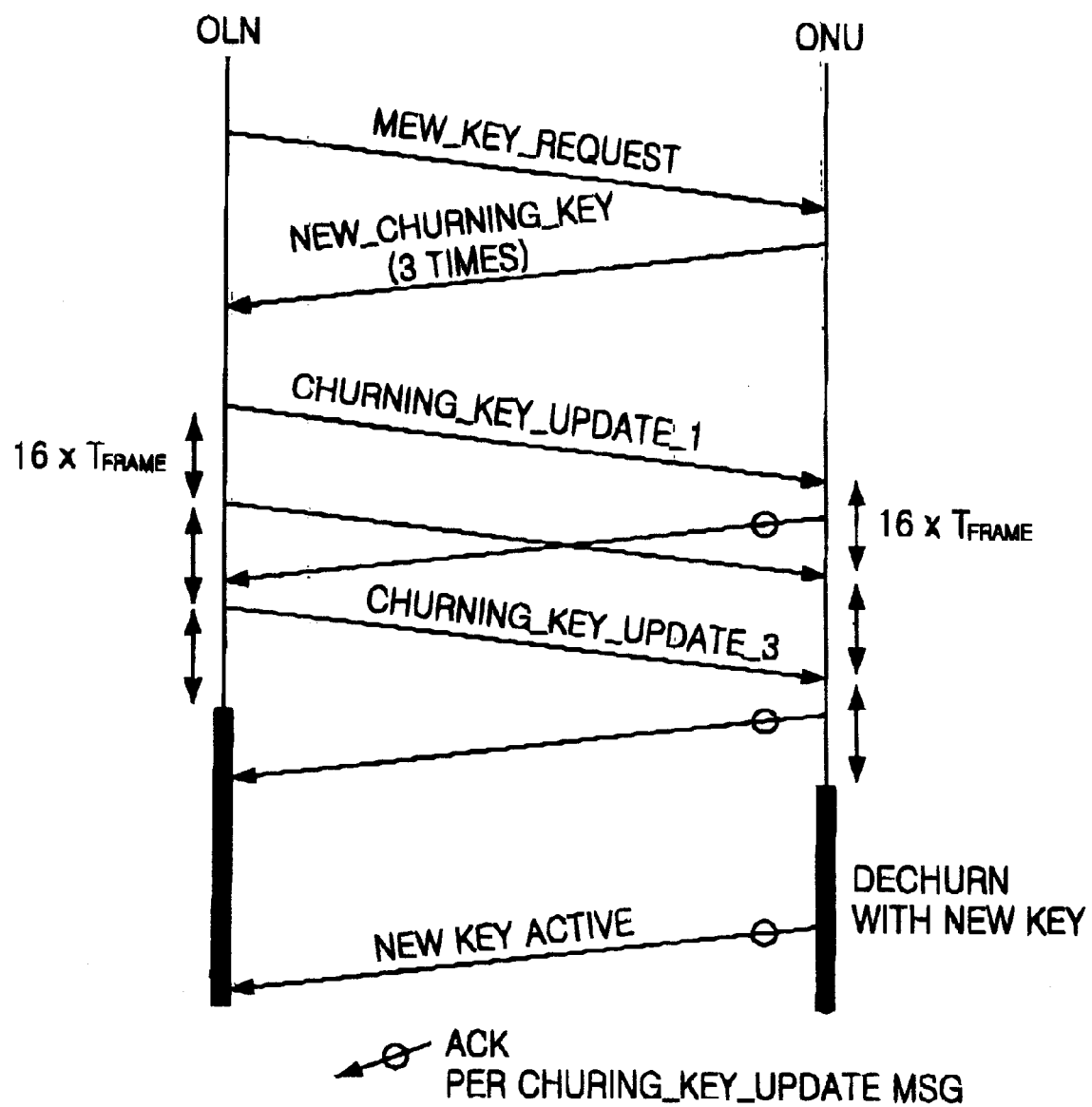
FIG. 7 is a diagram illustrating an encryption method in accordance with an embodiment of the present invention.

FIG. 7 is a flow chart showing the churning method in the ATM—PON system.

Referring to FIG. 7, after the ONU completes the distance measurement, the OLT requests a new churning key through a new key request NEW_KEY_REQUEST (hereinafter, referred to as NKR) message to the ONU at least once per second, and a corresponding ONU then transmits a new churning key to the OLT through the NKR message.

If the OLT receives the key three times, the OLT transmits a churning key update CHURNGING_KEY_UPDATE (hereinafter, referred to as CKU) message to the ONU three times at a predetermined interval ($16 \times T_{FRAME}$) together with a transmission numbers, in order to prepare a loss of the CKU message having a most priority to other messages.

If the corresponding ONU receives minimally one among three CKU messages, with knowledge of the interval ($16 \times T_{FRAME}$) between the messages, it is possible to know when a new key will be activated in the OLT.

After receiving correctly a first correct CKU message, the ONU transmits an ACK (acknowledge) signal with respect to the message reception to the OLT on the basis of G.983.1.

Figure 8:
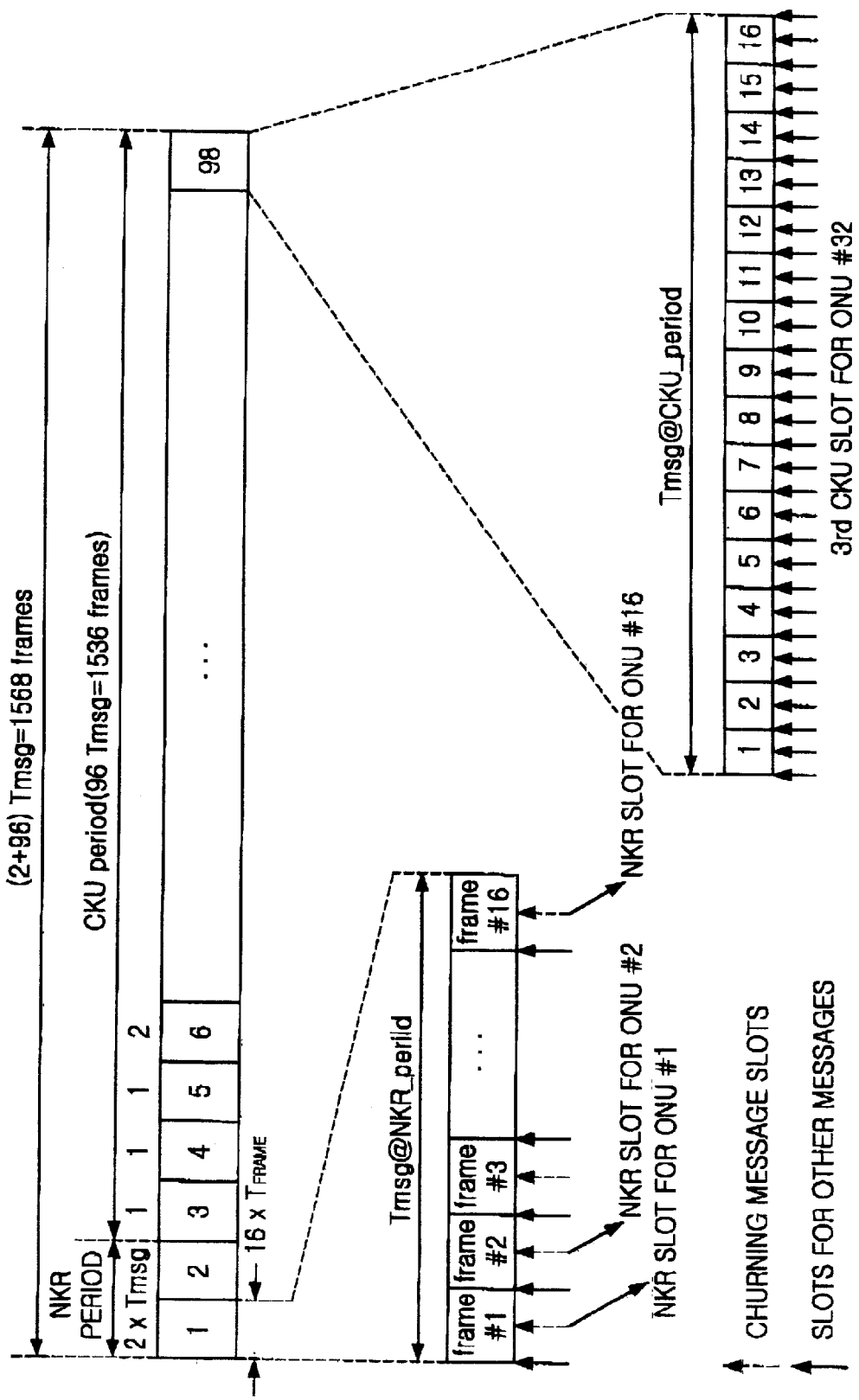
FIG. 8 is a timing chart illustrating a generation of a downstream message slot in an OLT according to the present invention.

FIG. 8 is a timing chart showing a downstream message slot generation in the OLT according to the present invention. A method for allocating a down message will be described with reference to FIG. 8.

First, since the CKU message should be transmitted at an interval of $16 \times T_{FRAME}$, if $16 \times T_{FRAME}$ is defined as one $T_{msg}$, three of $32 \times T_{msg}$ is required with respect to each ONU, so that $96 \times T_{msg}$ is required to transmit the CKU message with respect to each of thirty two ONUs.

The NKR message is not restricted to the time. However, if one $T_{FRAME}$ per ONU is allocated, the time required to transmit NKR message becomes $32 \times T_{FRAME}$, so that $98 \times T_{msg}$ ($98 \times 16 = 1568 \times T_{FRAME}$) is needed totally.

In case of 155.520 Mbps, a total of thirty two PLOAM cell slots exist within each $T_{msg}$. In accordance with the present invention, eighth PLOAM cell is selected and the CKU message is transmitted over the message field of the selected PLOAM cell.

Among twenty types of the downstream message recommended by telecommunication standardization sector of ITU—T, if the CKU and NKR messages are considered as an express message and a corresponding ONU is activated, the CKU and NKR messages are transmitted from a predetermined slot. After the other messages are necessarily generated by the microprocessor 5 to be stored in a specific memory, a message to be transmitted is determined with reference to various flags at every PLOAM slots.

Figure 9:
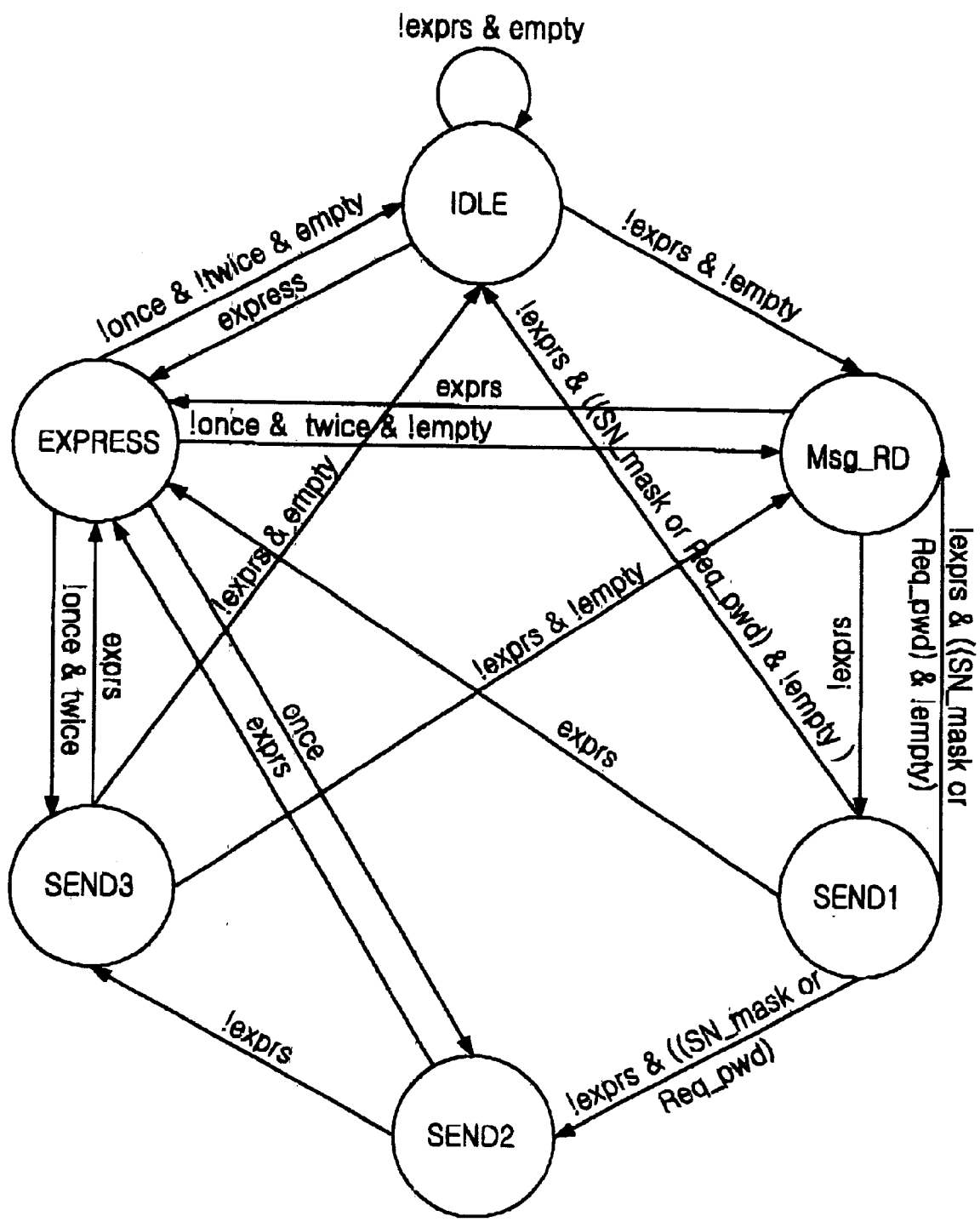
FIG. 9 is a block diagram illustrating a generation of a downstream message slot.

FIG. 9 is a state diagram showing a downstream message determination for determining message to be loaded into a PLOAM slot.

Referring to FIG. 9, if a current state is not an express message slot and a message memory is empty (! expres & empty), a serial_number_mask message and a request_password message are transmitted one time, based on the G.983.1, and the other messages are transmitted three times, so that the transmission number is determined according to message identification MESSAGE_ID read out from the memory device.

At this time, in case where the message memory in the message transmission slot is empty and is not the express message slot, a 'NO' message is transmitted.

As described above, since end-to-end ATM cell of the narrow bandwidth services of 622.08 Mbps in the downstream direction and 155.52 Mbps in the upstream direction, the wide bandwidth videos and the distributive services is transmitted to residing subscriber's terminals as well as managing subscriber's terminals in the range of 20 Km by using the wavelength division multiplexing method through one strip of the optical cable, the present invention can effectively make the best of the ATM service capacity.

Additionally, in order to transmit the message related to the key alternation at the time interval of $16 \times T_{FRAME}$, the PLOAM cell for transmitting the churning-related message is in advance designated and the actual churning-related message of the activated ONU is transmitted to the corresponding ONU, so that a manufacturing cost is remarkably reduced.

While the present invention has been described with respect to certain preferred embodiments only, other modifications and variation may be made without departing from the spirit and scope of the present invention as set forth in the following claims.

What is claimed is:

1. An optical line termination in an asynchronous transfer mode, comprising:

a downstream frame processing means for receiving and churning an asynchronous transfer mode cell to generate a downstream frame, and converting a parallel data of the downstream frame into a serial data thereof;

a wavelength division multiplexing means for performing an electro/optical conversion of the serial data of the downstream frame and performing a wavelength division multiplexing thereof;

a upstream frame processing means for extracting data from the wavelength division multiplexing means, searching an overhead field, delineating a slot boundary, and processing a physical layer operations administration and maintenance (PLOAM) cell and a divided slot separately;

a control signal generation means for performing a media access control (MAC) protocol and generating variables and timing signals used for the downstream frame processing means and the upstream frame processing means; and a control means for controlling the downstream frame processing means and the upstream frame processing means by using the variables and the timing signals from the control signal generation means.

2. The optical line termination as recited in claim 1, wherein the downstream frame processing means includes:

a universal test & operations physical interface for asynchronous transfer mode (UTOPIA) matching means for receiving an asynchronous transfer mode (ATM) cell from an external circuit and performing a cell speed matching;

a data churning means for churning the parallel data read out from the UTOPIA matching means by using a churning key received from each ONU;

a permission information management means for outputting a permission information generated by a microprocessor as the upstream permission information signal for a fair and dynamic bandwidth allocation of the upstream bandwidth;

a message generation means for receiving a message data from the microprocessor and a churning state information and a ranging message from the control means and determine and output contents of the downstream message;

a cell generation means for receiving a message from the message generation means and the permission information from the permission information management means to output a complete PLOAM cell;

a downstream frame generation means for receiving cells from the data churning mean and the cell generation means to generate the downstream frame; and a post-processing mean for receiving the downstream frame data, performing a BIP-8, and converting the parallel frame data into the serial frame data to output the serial frame data to the wavelength division multiplexing means.

3. The optical line termination recited in claim 1, wherein the control means includes:

a ranging processing means for calculating a cell transmission delay time of each optical network unit (ONU) to make the ONU to be positioned at a virtually same distance, and outputting a result of calculation to the wavelength division multiplexing means;

a permission information analysis means for analyzing an upstream permission information from the downstream processing means and determining as to from which ONU and a current received slot is, to thereby output a result to the upstream frame processing means and the ranging processing means;

a churning processing means for receiving a message reception signal from the upstream frame processing means and a slot information signal from the permission information analysis means, extracting a churning key from a reception message signal of each ONU and transferring the churning key to the downstream processing means; and a reference signal generation means for receiving a downstream signal from the downstream processing means to output a delayed reference signal to the upstream processing means, and for generating a reference signal more preceding by one slot than the reference signal to the downstream frame processing means.

4. The optical line termination recited in claim 1, wherein the upstream frame processing means includes:

a slot delineation means for receiving a received upstream serial data, a slot information from the controlling means and the reference SOC and delineating an upstream slot boundary;

a pre-processing means for descrambling the scrambled data from each ONU and outputting a divided slot cell having a queue information of each ONU;

a divided slot first in first out (FIFO) means for transferring the data of divided slot cell to the microprocessor;

a frame extracting means for dividing the upstream cell a UTOPIA reception means for performing a UTOPIA interface function;

a physical layer extracting means for receiving a slot information from the control means and a PLOAM cell from the frame extracting means and checking as to whether an ONU number and a message number are equal to a slot information signal;

a message processing means for receiving a message data from the physical layer extracting means, and transferring a message related to a churning and ranging to the control means, and outputting a performance information message by extracting contents thereof;

a performance information processing means for receiving the performance information message from the message processing means to process a performance information of each ONU;

a storage means for providing a performance analysis result of each ONU to the performance information processing means and the microprocessor, and for storing a processed result of the performance information processing means by slot unit; and a message FIFO means for storing a message transmitted from the physical extracting means to transfer the message to the microprocessor.

5. A churning method in an asynchronous transfer mode, comprising the steps of:

a) requesting a new churning key through a new key request message to an ONU, wherein the ONU completes a distance measurement;

b) transmitting the new churning key to an optical line termination (OLT) through the new key request message;

c) in case where the OLT receives the new churning key predetermined times, transmitting a churning key update message to the ONU predetermined times at a predetermined interval together with a transmission numbers; and d) after receiving a first correct churning key update message, transmitting an acknowledge signal representing a message reception to the OLT.

6. The churning method as recited in claim 5, wherein the step a) is performed by requesting the new churning key at least once per second.

7. The churning method as recited in claim 5, wherein the predetermined times is three times.

8. The churning method as recited in claim 7, wherein the predetermined interval is $16 \times T_{FRAME}$, where $T_{FRAME}$ is a period of frame.

9. A method for allocating a down message in an optical line termination, comprising the steps:

a) in case where a current state is not an express message slot and a message memory is empty, transmitting a serial number mask message and a request password message one time;

b) transmitting the other message three times, thereby determining the transmission numbers according to a message identification read out from a memory; and c) in case where the message memory is empty and is not the express message slot, transmitting a NO message.

* * * * *